United States Patent
Galvin

(10) Patent No.: US 7,343,010 B2
(45) Date of Patent: *Mar. 11, 2008

(54) SYSTEM AND METHOD FOR INTEGRATED RESOURCE SCHEDULING AND TASK ALLOCATION

(75) Inventor: Brian R. Galvin, Albuquerque, NM (US)

(73) Assignee: Genesys Telecommunications Laboratories, Inc., Daly City, CA (US)

(*) Notice: Subject to any disclaimer, the term of this patent is extended or adjusted under 35 U.S.C. 154(b) by 523 days.

This patent is subject to a terminal disclaimer.

(21) Appl. No.: 10/373,393

(22) Filed: Feb. 24, 2003

(65) Prior Publication Data

US 2004/0165716 A1    Aug. 26, 2004

Related U.S. Application Data

(60) Provisional application No. 60/359,371, filed on Feb. 25, 2002.

(51) Int. Cl.
*H04M 3/523*   (2006.01)
*G05B 19/418*  (2006.01)

(52) U.S. Cl. ............. 379/265.03; 379/265.04; 379/265.05; 379/265.06; 379/266.07; 700/100; 705/9

(58) Field of Classification Search ......... 379/265.01, 379/265.02, 265.03, 265.04, 265.05, 265.06, 379/265.07, 265.08, 266.07; 705/8, 9; 700/99–102
See application file for complete search history.

(56) References Cited

U.S. PATENT DOCUMENTS

| | | | | |
|---|---|---|---|---|
| 5,185,780 A | * | 2/1993 | Leggett | 379/265.08 |
| 5,546,452 A | * | 8/1996 | Andrews et al. | 379/219 |
| 6,044,355 A | * | 3/2000 | Crockett et al. | 705/8 |
| 6,128,380 A | * | 10/2000 | Shaffer et al. | 379/265.01 |
| 6,324,282 B1 | * | 11/2001 | McIllwaine et al. | 379/265.06 |
| 6,574,605 B1 | * | 6/2003 | Sanders et al. | 705/8 |
| 7,110,525 B1 | * | 9/2006 | Heller et al. | 379/265.11 |
| 2002/0052770 A1 | * | 5/2002 | Podrazhansky | 705/7 |

\* cited by examiner

*Primary Examiner*—Harry S. Hong
(74) *Attorney, Agent, or Firm*—Donald R. Boys; Central Coast Patent Agency, Inc

(57) ABSTRACT

According to the invention, a system and method for integrating call routing and workforce management functions in contact centers, enabling them to work together without opposing the influence of one against that of the other, is disclosed. In an embodiment of the invention, a feedback mechanism is provided between the routing system and either the forecasting engine or the adherence module of the workforce management system, or both. This feedback mechanism is used to pass useful information dynamically between the said workforce management system and the said routing system, said information exchange being unidirectional in either direction, or bidirectional. In another embodiment of the invention, a method in which information is passed from a call routing system to a forecasting engine or an adherence module of a workforce management system, or both, is disclosed.

3 Claims, 4 Drawing Sheets

US 7,343,010 B2

SYSTEM AND METHOD FOR INTEGRATED RESOURCE SCHEDULING AND TASK ALLOCATION

This application is a non-provisional of U.S. Provisional Patent Application No. 60/359,371, and claims benefit thereto.

BACKGROUND OF THE INVENTION

The task of generating optimized schedules for contact center agents and other related resources has been known for years to be a complex one, and has spawned an entire industry of companies which provide products, of varying sophistication, which attempt to provide optimal resource scheduling for contact centers. Known as workforce management systems, the products known in the art generally perform a common series of sequential tasks in order to accomplish the scheduling function. Referring to FIG. 1, the first step of workforce management is to gather historical data on call volumes 100 for the contact centers in question; this data is generally broken out by call activities or skills, such as sales, service, complaints, etc. Data 101 is also obtained, similarly segregated by activity or skill, for the average handling time of calls, which is the total time a call takes within the contact center from start to completion (which is usually defined as the time when the agent who handled the call last completes any call-related work after the caller is released). Note that "call" as used in discussing the present invention can be a traditional phone call carried by the public switched telephone network (PSTN), a voice-over-IP (VoIP) call, an e-mail, or any other customer interaction arriving at or commencing in a contact center.

Second, the data on call volumes and handle times is run through a forecasting engine 102 to generate a forecast 103 of anticipated call volumes and handle times for the period to be scheduled. The technique used to create the forecast can be one of a multitude of techniques known in the art, including but not limited to neural network forecasting, statistical forecasting, template-based forecasting, genetic algorithms and neural networks where the weighting functions are determined by genetic algorithms. The forecast is then modified by the inclusion of the anticipated effects on call volume and handling times resulting from upcoming events such as catalog mailings, television advertisements, and so forth. The modified forecast is then used to generate a forecast of agent resource demand 104, based on the forecast and the desired agent occupancy rates 105 (that is, if you need 9 agents on calls and agents are intended to be busy 90% of the time they are on duty, then you will need 10 agents available to handle the expected traffic). Note that "agent resource" usually refers to human agents but can also refer to interactive voice response (IVR) ports against which scripts have been loaded to handle customer interactions automatically. Usually but not necessarily, this agent resource demand forecast is generated in 15 minute increments for the entire schedule period.

Next, a scheduling engine 106, which takes into account a plurality of business rules 107 concerning break policies, shift schedules, maximum and minimum workweeks, meal scheduling, and other related scheduling influences, creates an optimized overall schedule 108 which includes specific work times for each agent. Often agent preferences and vacation requests are included in this scheduling step. These scheduling engines 106, like the forecasting engines 102, use a plurality of well-known optimization techniques to generate a schedule which ensures that the expected traffic is handled within established service level limits while meeting as many of the business rules and agent preference constraints as possible. Finally, during the period the schedule is in effect, an adherence monitor 109 measures conformance to the schedule in real time, usually by integration of the workforce management system with one of the many interaction management engines 110 known in the art (including for example automated call distribution systems, computer-telephony integration systems, e-mail management systems). Usually a graphic display of the current performance of the contact center relative to the forecast is provided, showing where deviations from the forecast and the schedule are occurring, and showing what their effect is on service levels.

In parallel with the emergence in the art of computer-implemented workforce management systems working as described above, and referring to FIG. 2, there have emerged in the last decade a number of very sophisticated routing engines 203 which determine, in real time, how to allocate calls and other tasks to agent resources. These systems generally receive event notification 202 of the arrival of a new interaction (or of a transferred interaction that requires redirection) from the interaction management engine 110. They then execute scripts which can take into account data concerning current agent availability 204, statistical results 205 of recent operations, customer information 206 (such as loyalty level, profitability, identity of agent who last handled, and so forth), and call data 207 such as ANI and DNIS, in order to select which of the available agents is the most appropriate to receive the interaction. When all appropriate agents are busy, the routing engine 203 applies an appropriate treatment to the call, such as playing music or an announcement informing the caller that all agents are busy, and then waits for an agent to become available. When an agent does become available, the routing engine 203 then chooses the most appropriate call to deliver to that agent, from among the plurality of calls awaiting an available agent. It then sends routing instructions 208 to the interaction management engine 110, which relays this information to a media server 200 such as a PBX with ACD or an e-mail server.

The problem which the present invention addresses is that these two important technologies in the contact center industry in fact work against one another. Workforce management products that follow the sequence of steps outlined above (which means all workforce management products in the art) rely on two key implicit assumptions. First, workforce management products assume that the future will behave much like the past—this is a central assumption of the forecasting step. It means that call volumes and call handle times are external variables that do not depend on any other systems in the contact center—they are what they are, and they can be forecast based on historical data. Second, workforce management products implicitly assume call volumes and handling times are independent variables relative to each other. Frustrating these assumptions is the fact that modern, sophisticated routing systems all operate independently of the workforce management systems. Routing engines 203 take the staffing available at the moment, the statistical behavior in the immediate past (usually the last hour or so), and the current call volume, and use this information to make routing decisions. It is easily within the capability of existing routing engines 203 to change call volumes for various skills or activities by diverting some calls away from agents to IVR ports in heavy traffic periods (thus increasing the volume for the IVR and decreasing the volume for the agent population which would have gotten the call). For organizations with multiple sites, calls can be diverted to other sites to avoid congestion. Quite often, routing engines 203 are tasked to dynamically change their target list (the list of agents considered as appropriate for a given interaction), in response to traffic conditions, time the call has been waiting, and so forth. Each of these routing actions acts to invalidate the core assumptions of the workforce management forecasting engine 102, and in fact, the problem invariably gets worse as more sophisticated (i.e., more useful) routing strategies are deployed. Existing workforce management systems were designed with basic ACD (automatic call distribution) queuing in mind and do not work well with modern routing engines 203.

BRIEF DESCRIPTION OF THE DRAWINGS

The present invention is described in conjunction with the appended figures.

DETAILED DESCRIPTION OF THE PREFERRED EMBODIMENT

The ensuing description provides preferred exemplary embodiments only, and is not intended to limit the scope, applicability or configuration of the invention. Rather, the ensuing description of the preferred exemplary embodiments will provide those skilled in the art with an enabling description for implementing a preferred exemplary embodiment of the invention. It should be understood that various changes may be made in the function and arrangement of elements without departing from the spirit and scope of the invention as set forth in the appended claims.

Embodiments of the present invention disclose a system and method for integrating the call routing and workforce management functions described above, in order to enable them to work together without opposing the influence of one against that of the other.

Figure 1:
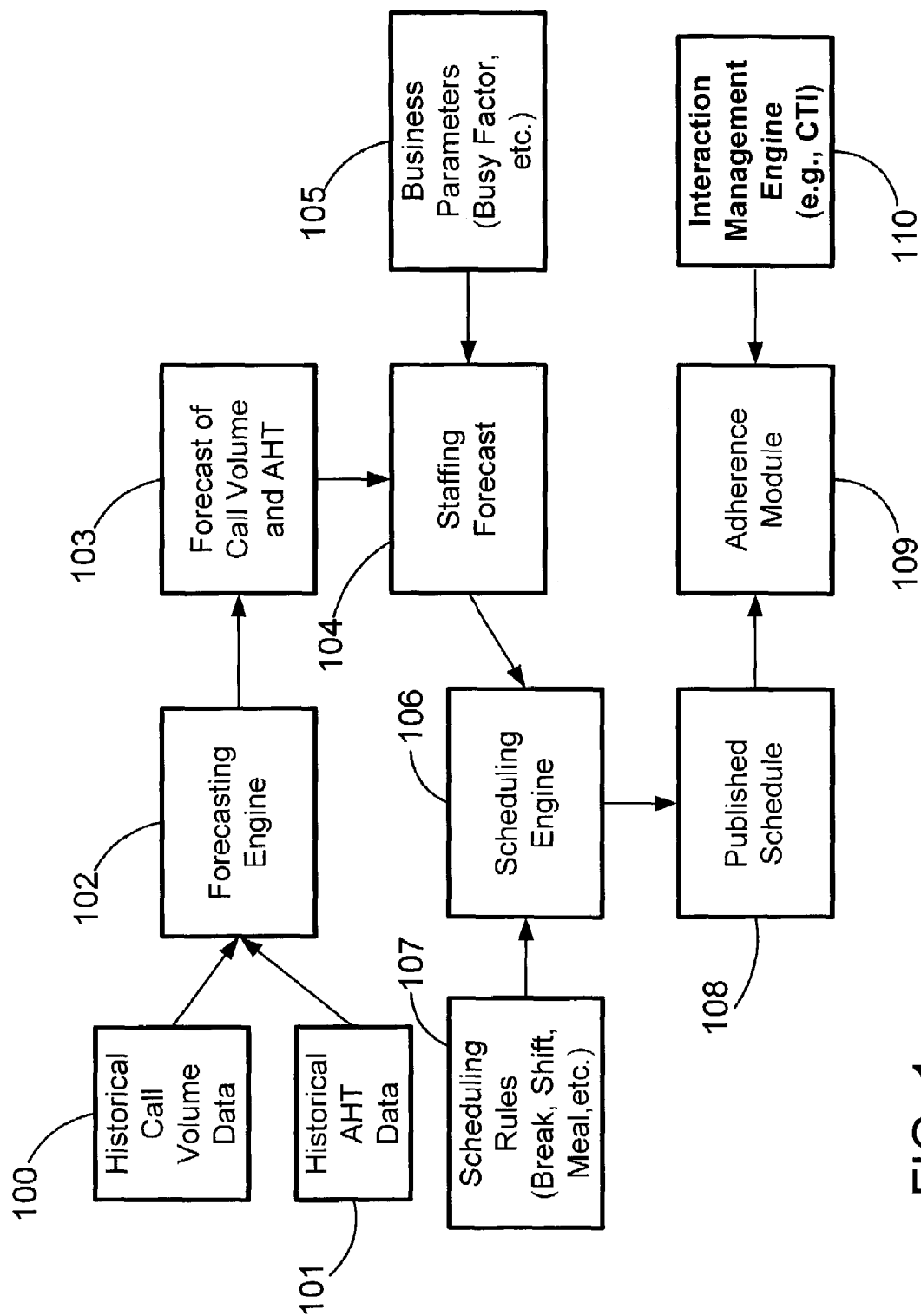
FIG. 1 is a diagram of a typical prior art workflow management system.
Figure 2:
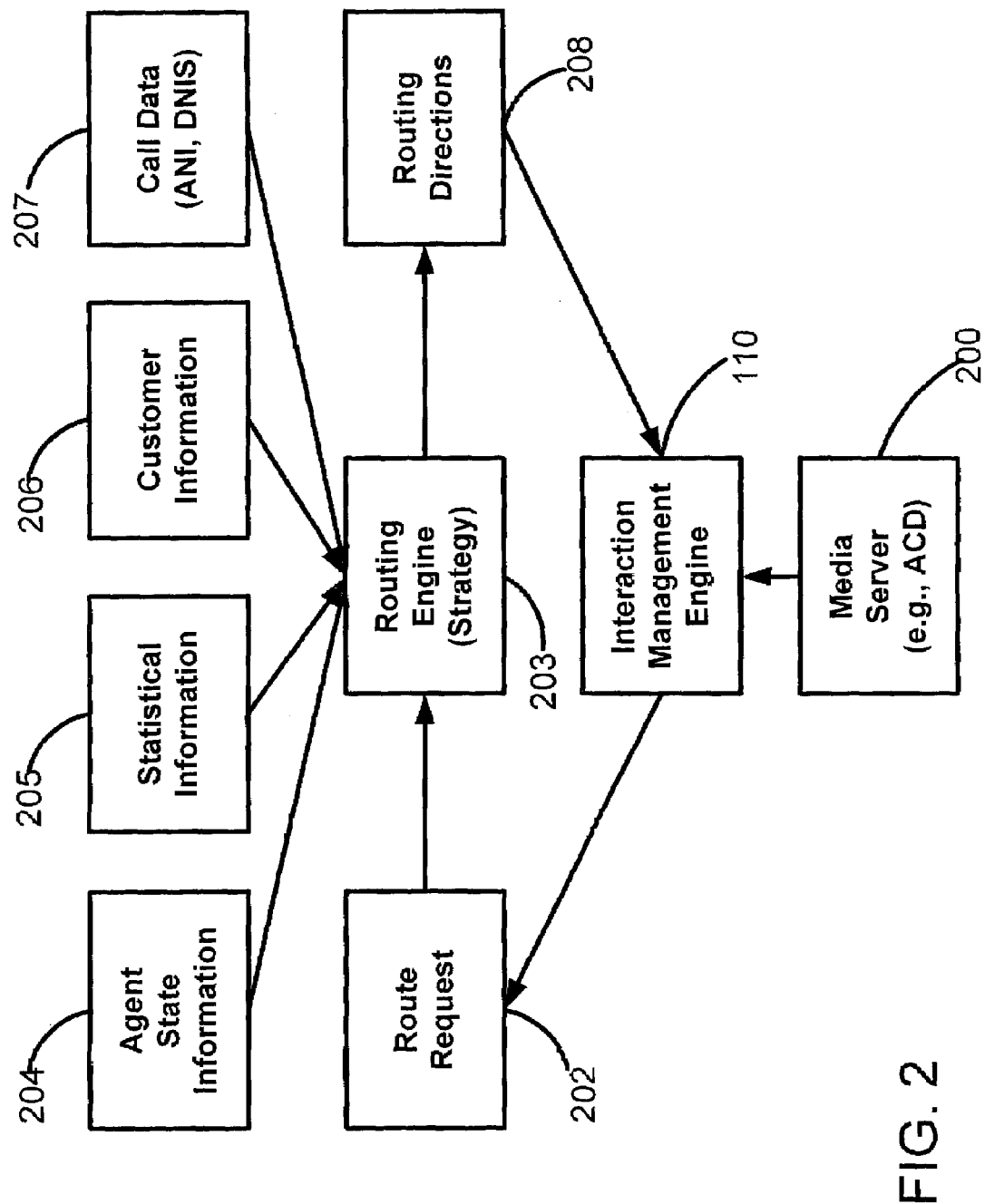
FIG. 2 is a diagram of a typical prior art routing system.
Figure 3:
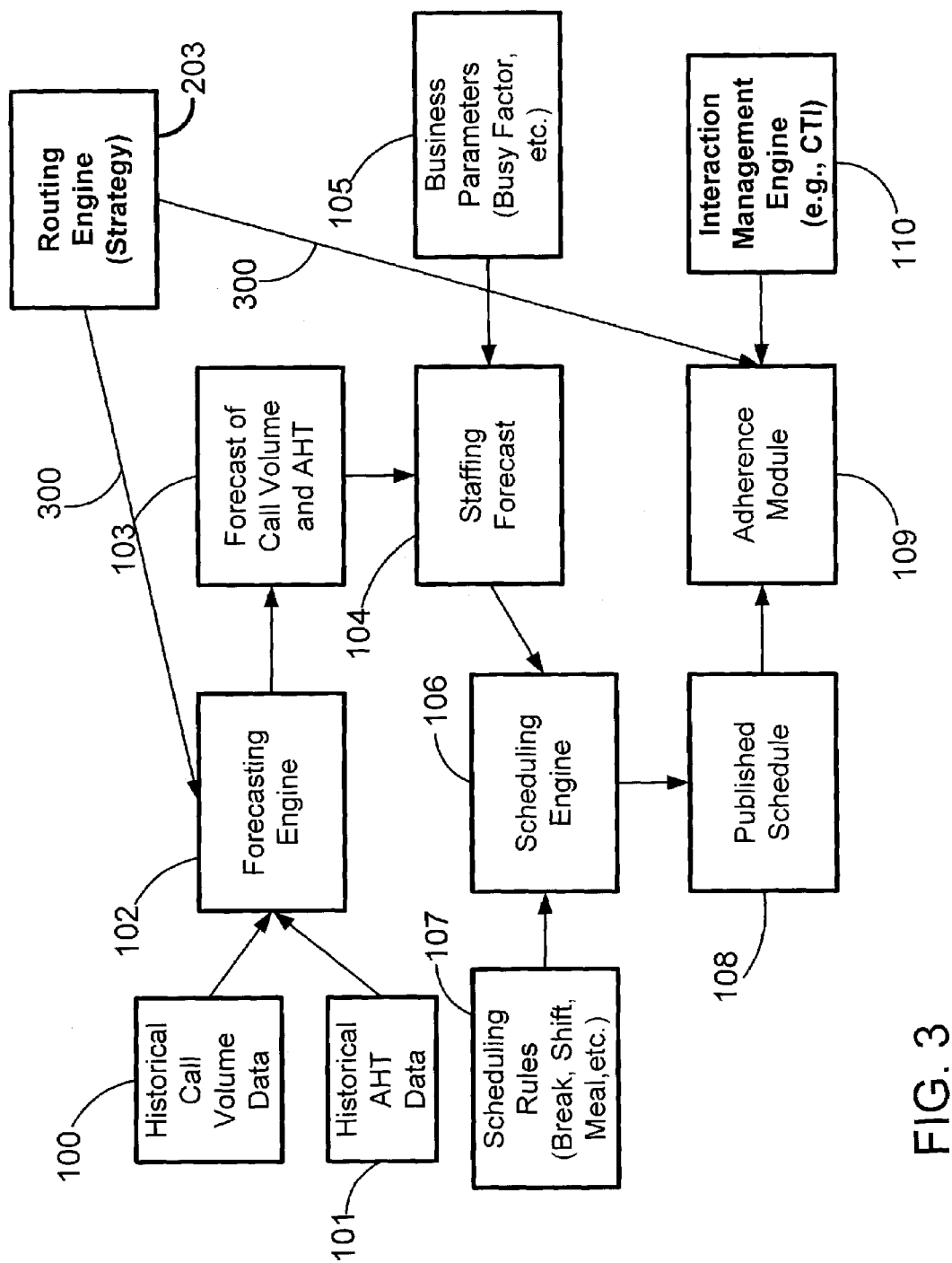
FIG. 3 is a diagram of a workflow management system showing an embodiment of the present invention.

In one preferred embodiment of the present invention, and referring to FIG. 3, a workforce management (WFM) system of the type described above and well-known in the art is modified by the addition of feedback means 300 from the routing engine 203 to the forecasting engine 102 or the adherence module 109, or both. The information passed via this mechanism can be any information available to the routing engine 203, and can be passed in any of a number of ways well established in the art. In an embodiment of the invention, the information is passed from the routing engine 203 to the forecasting engine 102 or the adherence module 109 or both via data that is "attached" to the call, or added to the data about the call that is maintained by the predefined interaction management engine 110. This is a common method in the art of passing contextual data concerning an ongoing interaction from one part of an interaction management system to another, in this case from routing to WFM. In another embodiment, data is passed directly from the routing engine 203 to the forecasting engine 102 or the adherence module 109 or both in the form of an XML data tree, another method well established in the art. In yet another embodiment, information can be passed from the routing engine 203 to the forecasting engine 102 or the adherence module 109 or both by insertion into a database table which is periodically read by the recipient components.

In a preferred embodiment of the present invention, this information is a matrix of permissible cross-linkages between skills or activities. If each row of the matrix, and the corresponding column, are taken to represent a single skill level or activity which is used in forecasting and scheduling by the WFM system, then a 1 represents a permissible linkage from the skill corresponding to the row to the skill corresponding to the column. A permissible linkage means that the routing engine 203 will, if wait times are too long or available agent population is too small or for any other reason suitable to the routing logic, route a call for the first skill (corresponding to the row) to an agent with the second skill (corresponding to a column). For example, a 1 at (Sales 1, Sales 2)—which signifies the element at the intersection of the row corresponding to Sales 1 skill and the column corresponding to Sales 2 skill—means that a call that normally requires a Sales 1 skill may be routed by the routing engine 203 to an agent with a Sales 2 skill if conditions warrant. A zero corresponds to a non-permissible transition. This matrix can be used by the forecasting engine 102 to reduce forecast volatility by taking into account the fact that spikes in traffic in one skill may be mitigated by sending some of the calls to a second skill.

In another embodiment of the present invention, real-time data on the distribution of calls requiring different skills is sent via the feedback mechanism 300 from the routing engine 203 to the forecasting engine 102 to accelerate the creation of accurate forecasts when new skills are introduced. When new skills are introduced, or when a new routing strategy is introduced that segments calls in a new way, the forecasting engine 102 is unable to create a forecast because there is no data available yet that breaks calls out in the corresponding way. In some cases, as when sophisticated routing is being introduced to an ongoing operation, the only data available will be bulk data, typically broken out by DNIS (e.g., Sales can be distinguished from Service, but not much more). In other cases, more refined segmentation may be available, but it may be different than the new scheme and therefore useless to the forecasting engine 102. With updates received from the routing engine 203 after the introduction of the new skill or strategy, the forecasting engine 102 will be able to determine what proportion of the calls for each category for which it does have historical data is due to each of the new segments (in other words, if there is data by DNIS, the forecasting engine will be able to determine what percentage of calls to a particular DNIS correspond to each new segment). When enough data points have been gathered from the routing engine 203 so that the cumulative percentages vary only slightly over time, the forecasting engine 102 can then apply them retroactively to the data it has already collected, thus arriving at an accurate forecast relevant to the new routing strategy quickly.

Figure 4:
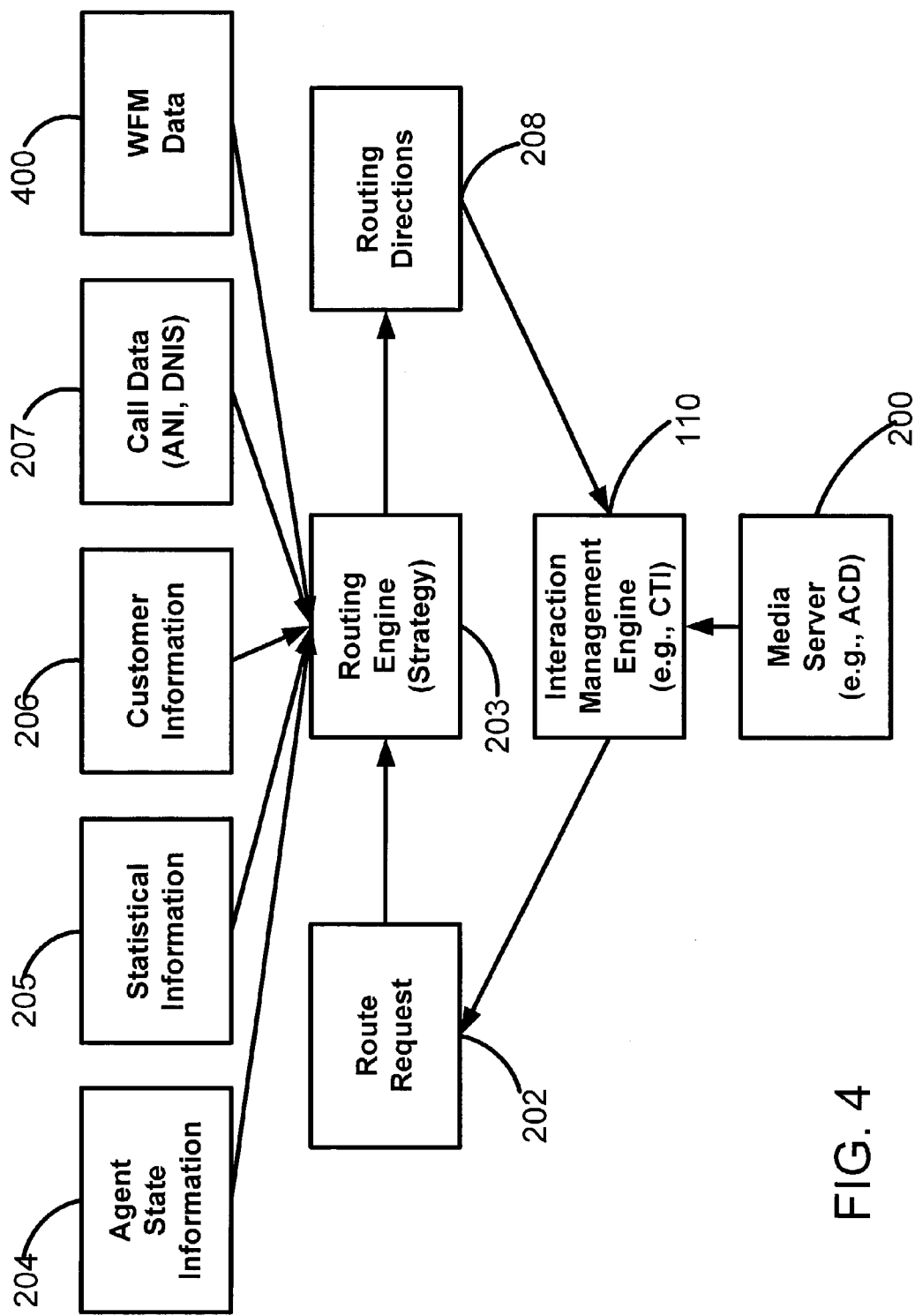
FIG. 4 is a diagram of a routing system showing an embodiment of the present invention.

In another embodiment of the present invention, and referring to FIG. 4, the routing system described previously is modified by the availability of WFM Data 400, which can be generated either by the Adherence Module 109 or other components of the WFM system. The information that can be passed via this mechanism can be any information available to the workforce management system, and can be passed in any of a number of ways well established in the art. In an embodiment of the invention, the information is passed from the Adherence Module 109 or other components of the WFM system to the routing engine 203 via data that is "attached" to the call, or added to the predefined interaction information maintained by the interaction management engine 110. This is a common method in the art of passing contextual data concerning an ongoing interaction from one part of an interaction management system to another, in this case from routing to WFM. In another embodiment, data is passed directly from the Adherence Module 109 or other components of the WFM system to the routing engine 203 in the form of an XML data tree, another method well established in the art. In yet another embodiment, information can be passed from the Adherence Module 109 or other components of the WFM system to the routing engine 203 by insertion into a database table which is periodically read by the recipient components.

In an embodiment of the present invention, the WFM data 400 is adjusted forecast data for the next forecasting increment (typically but not always, 15 minutes). Most WFM systems in the art continually update the forecast during the day to reflect deviations from the initial forecast 104 that have occurred. While most routing engines 203 have access to real time statistical information concerning contact center operations, this data is necessarily retrospective. Having access to the adherence module's 109 forecast of the next time increment makes it possible for routing strategies to proactively react to impending problems before they hit. For instance, if the adherence monitor 109 informs the routing engine 203 that the noon time segment is likely to have traffic at 125% of forecast, and service levels very far below the standard set for the contact center as a result, then the routing engine 203 can begin to send lower value or lower complexity calls to an IVR for automated processing. Since routing engines 203 today have tremendous flexibility in how to handle calls, including even offering the caller an incentive to hang up and get a callback at an agreed time in the future, it will be seen that this ability of the adherence module 109 to warn the routing engine 203 of impending problems will enable the routing engine to mitigate the effect of those problems. When the routing system and the workflow management system work together, it becomes possible to more closely achieve service level goals of a contact center with reduced staffing, because the workforce management system can be more conservative in its scheduling given that the routing engine can compensate for deviations from forecast.

In another embodiment of the present invention, the workforce management engine 102 sends information on staffing to the routing engine, and the adherence module 109 updates that information by informing the routing engine 203 of any deviations from the staffing plan. The information so provided can be at a skill level, as for example that there will be 10 Sales agents coming on duty in 5 minutes, or at the individual level, as for example that agent Bob Jones is scheduled to be online in 5 minutes. In the first case, this information can be used by the routing engine 203 to tune the routing strategy to take advantage of the new knowledge. For example, calls which might have gone to overflow because the current sales agents are busy could be held, with an announcement, for five minutes to take advantage of the upcoming availability of several more sales agents. In the second case, this information would be very useful in applications where a caller is to be routed to the agent who last handled the caller (a common scenario in support operations); if the information were not available, the routing engine would have to route to an alternate agent, but now the routing engine can inform the caller that the agent who handled the caller last will be available in approximately five minutes, and the caller could be given the option to wait for that agent.

What is claimed is:

1. A system for integrating call routing and workforce management functions in contact centers, comprising:
    a workforce management system consisting of at least a forecasting engine, a business rules module, a scheduling engine, and an adherence module;
    a routing engine; and
    an electronic feedback mechanism between the said routing engine and either the said forecasting engine or the said adherence module of the said workforce management system, or both;
    wherein useful information is directly exchanged dynamically between the said workforce management system components and the said routing engine during a specific operating period said information exchange being unidirectional in either direction, or bidirectional, and wherein the information exchanged is used dynamically to modify one or both of behavior of the workforce management system or the routine engine within the operating period.

2. A method for integrating call routing and workforce management functions in contact centers, the method comprising of the steps of:
    providing a dynamic software-based electronic feedback mechanism between the routing engine and components of a workforce management system;
    using the said feedback mechanism to directly pass useful information from the components in the workforce management system dynamically to the routing engine during a specific operating period; and
    dynamically modifying the behavior of the said routing engine to take advantage of the information thus provided from the components of the said workforce management system within the operating period.

3. A method for integrating call routing and workforce management functions in contact centers, the method comprising of the steps of:
    providing a dynamic software-based electronic feedback mechanism between a routing engine and selected components which make up a workforce management system;
    using the said feedback mechanism to directly pass useful information from the routing engine dynamically to selected components of the workforce management system during a specific operating period; and
    dynamically modifying the behavior of the workforce management functions to take advantage of the information thus provided from the said routing engine within the operating period.

* * * * *